(12) United States Patent
Hayes (10) Patent No.: US 7,089,196 B2
(45) Date of Patent: Aug. 8, 2006

(54) SYSTEM AND METHOD FOR LEAN INVENTORY MANAGEMENT

(75) Inventor: Timothy R. Hayes, Plano, TX (US)

(73) Assignee: i2 Technologies US. Inc., Dallas, TX (US)

( * ) Notice: Subject to any disclaimer, the term of this patent is extended or adjusted under 35 U.S.C. 154(b) by 487 days.

(21) Appl. No.: 09/832,576

(22) Filed: Apr. 11, 2001

(65) Prior Publication Data

US 2002/0178092 A1    Nov. 28, 2002

(51) Int. Cl.
    *G06Q 7/00*    (2006.01)
(52) U.S. Cl. .......................................... 705/22; 705/22
(58) Field of Classification Search .................. 705/15, 705/16, 17, 18, 20, 22, 23, 24, 26, 27, 28, 705/29, 30
    See application file for complete search history.

(56) References Cited

U.S. PATENT DOCUMENTS

| | | | |
|---|---|---|---|
| 5,446,890 A * | 8/1995 | Renslo et al. | 707/104.1 |
| 5,712,985 A * | 1/1998 | Lee et al. | 705/7 |
| 5,819,232 A * | 10/1998 | Shipman | 705/8 |
| 5,914,878 A * | 6/1999 | Yamamoto et al. | 700/106 |
| 5,963,919 A * | 10/1999 | Brinkley et al. | 705/28 |
| 6,341,271 B1 * | 1/2002 | Salvo et al. | 705/28 |
| 6,393,332 B1 * | 5/2002 | Gleditsch et al. | 700/99 |
| 6,397,118 B1 * | 5/2002 | Gleditsch et al. | 700/99 |
| 6,415,194 B1 * | 7/2002 | Gleditsch et al. | 700/99 |
| 6,415,195 B1 * | 7/2002 | Gleditsch et al. | 700/99 |
| 6,415,196 B1 * | 7/2002 | Crampton et al. | 700/100 |
| 6,415,260 B1 * | 7/2002 | Yang et al. | 705/10 |
| 6,516,301 B1 * | 2/2003 | Aykin | 705/10 |
| 6,629,004 B1 * | 9/2003 | Ivezic et al. | 700/97 |
| 6,804,658 B1 * | 10/2004 | Lim et al. | 705/10 |
| 2002/0103686 A1 * | 8/2002 | Slocum | 705/8 |
| 2002/0169657 A1 * | 11/2002 | Singh et al. | 705/10 |

OTHER PUBLICATIONS

White, Ron, How Computers Work, Millennium Ed. Que Corporation, Sep. 1999.*
Derfler, Frank J. et. al. How Networks Work, Millennium Ed., Que Corporation, Jan. 2000.*
Gralla, Preston, How the Internet Works, Millennium Ed., Que Corporation, Aug. 1999.*
Hirschey, Mark, and Pappas, James L.; Managerial Economics, 8th Ed., The Dryden Press, Fort Worth, TX, 1996.*
Horngren, Charles T., and Sundem, Gary L., Introduction to Financial Accounting, Revised 3rd Ed., Prentice-Hall, Inc., 1988.*

* cited by examiner

*Primary Examiner*—Andrew J. Fischer
(74) *Attorney, Agent, or Firm*—Steven J. Laureanti; James E. Walton (57) ABSTRACT

A system (100) for inventory management includes memory (116) containing a cumulative demand value (252) for each of a plurality of time windows (204) within a planning horizon (200). The cumulative demand value (252) for a time window (204) represents a cumulative demand for at least one product over the time window (204) and all previous time windows (204) in the planning horizon (200). The memory (116) also includes a cumulative production value (254) for each time window (204). The cumulative production value (254) for a time window (204) represents a cumulative quantity of the product that can be manufactured over the time window (204) and all previous time windows (204) in the planning horizon (200). The system (100) also includes one or more processors (114) collectively operable to determine a lean buffer stock value using the cumulative demand values (252) and the cumulative production values (254). The lean buffer stock value represents a quantity of the product to use as a lean buffer stock for the planning horizon (200). The one or more processors (114) are also collectively operable to make the lean buffer stock value available for use in manufacturing the product.

21 Claims, 3 Drawing Sheets

SYSTEM AND METHOD FOR LEAN INVENTORY MANAGEMENT

TECHNICAL FIELD OF THE INVENTION

This invention relates generally to the field of planning, and more particularly to a system and method for lean inventory management.

BACKGROUND OF THE INVENTION

In the manufacturing industry, different paradigms and manufacturing models impose different rules on the manufacture of a product. One of these manufacturing models is called "lean manufacturing" or "lean inventory management." The lean manufacturing model attempts to eliminate waste in the manufacturing process by creating a stable production environment. One way of creating stability involves imposing a leveling constraint in the production environment. Production of a product may occur during a period of time, which may be divided into multiple windows or "buckets" of time. A leveling constraint dictates that the same amount of the product should be produced during each time window.

The lean manufacturing model attempts to remain responsive to customer needs, supplying customers with products when the customers need the products, while eliminating waste in the production environment. One way manufacturers attempt to maintain responsiveness is to store some quantity of a product in inventory as "safety stock." Because manufacturers typically cannot predict customer demand for a product with absolute certainty, forecasts or predictions of customer demand typically include some amount of error. The forecast error means that customer demand for the product may be higher or lower than predicted. Safety stock helps protect the manufacturer when customer demand for the product is higher than expected. When the manufacturer cannot produce enough of the product to satisfy the higher customer demand, the manufacturer may use the safety stock to meet the customer demand.

A problem with this approach is that safety stocks typically fail to protect a manufacturer from both forecast error in the demand forecast and customer demand spikes. A customer demand spike refers to a period when demand for a product is greater than surrounding time periods. In some lean manufacturing environments, the goal is to produce the same amount of a product during each window of time. When a customer demand spike occurs during later time windows, the manufacturer may produce enough of the product during the earlier time windows to meet this higher demand. When a customer demand spike occurs during earlier time windows, the manufacturer may be unable to produce enough of the product to meet this early demand. While safety stocks may protect a manufacturer against early customer demand for a product, it typically cannot protect the manufacturer both from forecast error in the demand forecast and from early customer demand spikes. This leaves the manufacturer vulnerable to "stock-outs," or times when the manufacturer cannot meet customer demand because no product is in stock.

Another problem with this approach is that identifying a quantity of a product to protect against both forecast error in the demand forecast and customer demand spikes is difficult. It is often a simple task to identify a quantity of a product to use as a safety stock. A manufacturer typically uses the average and standard deviation of customer demand for a product to determine an appropriate size for the safety stock. It is typically more difficult to identify a quantity of a product to protect against customer demand spikes in a lean manufacturing environment. The amount of inventory needed to protect against customer demand spikes is typically unrelated to the forecast error of the demand forecast. As a result, manufacturers often attempt to guess how much inventory is needed to protect against customer demand spikes, which typically results in inaccurate estimates. When demands associated with multiple customers are considered, it becomes even more difficult to predict the quantity of the product needed to protect against customer demand spikes, which results in even more inaccurate estimates.

As a result of any of these or other disadvantages, previous lean inventory management techniques have been inadequate in many manufacturing environments.

SUMMARY OF THE INVENTION

According to the present invention, problems and disadvantages associated with previous lean inventory management techniques have been substantially reduced or eliminated.

According to one embodiment of the present invention, a system for inventory management includes memory containing a cumulative demand value for each of a plurality of time windows within a planning horizon. The cumulative demand value for a time window represents a cumulative demand for at least one product over the time window and all previous time windows in the planning horizon. The memory also includes a cumulative production value for each time window. The cumulative production value for a time window represents a cumulative quantity of the product that can be manufactured over the time window and all previous time windows in the planning horizon. The system also includes one or more processors collectively operable to determine a lean buffer stock value using the cumulative demand values and the cumulative production values. The lean buffer stock value represents a quantity of the product to use as a lean buffer stock for the planning horizon. The one or more processors are also collectively operable to make the lean buffer stock value available for use in manufacturing the product.

In another embodiment of the invention, a method for inventory management includes determining a cumulative demand value for each of a plurality of time windows within a planning horizon. The cumulative demand value for a time window represents a cumulative demand for at least one product over the time window and all previous time windows in the planning horizon. The method also includes determining a cumulative production value for each time window. The cumulative production value for a time window represents a cumulative quantity of the product that can be manufactured over the time window and all previous time windows in the planning horizon. The method further includes determining a lean buffer stock value using the cumulative demand values and the cumulative production values. The lean buffer stock value represents a quantity of the product to use as a lean buffer stock for the planning horizon. In addition, the method includes making the lean buffer stock value available for use in manufacturing the product.

Numerous technical advantages are provided according to various embodiments of the present invention. Particular embodiments of the invention may exhibit none, some, or all of the following advantages. For example, the present invention may allow a manufacturer to determine an appropriate amount of inventory needed to protect the manufacturer from customer demand spikes. The manufacturer may identify the amount of inventory to keep as a "lean buffer stock," which may be used to protect the manufacturer from early customer demand spikes. This helps to reduce the likelihood that a manufacturer will suffer a "stock-out" and be unable to meet customer demand for a product. In a lean manufacturing environment, the present invention helps protect the manufacturer even when a customer demand spike occurs during earlier windows of time. To provide an additional layer of protection, the manufacturer may also keep some quantity of the product in inventory as a safety stock, which protects the manufacturer from forecast error in the demand forecast, such as when customer demand exceeds the manufacturer's predicted demand.

The present invention may also be used in environments where multiple customers have changing demand needs and differing demand spikes. This provides even greater protection to the manufacturer.

Other technical advantages are readily apparent to one of skill in the art from the attached figures, description, and claims.

BRIEF DESCRIPTION OF THE DRAWINGS

To provide a more complete understanding of the present invention and features and advantages thereof, reference is made to the following description in conjunction with the accompanying drawings, in which.

DETAILED DESCRIPTION OF THE INVENTION

Figure 1:
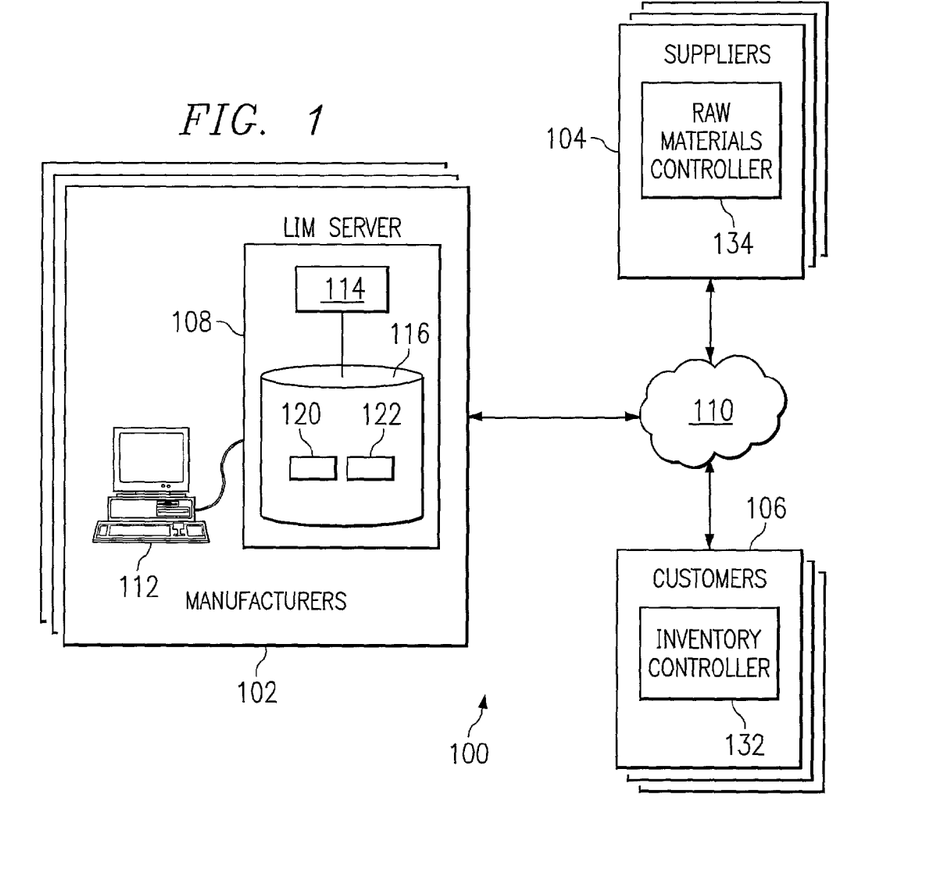
FIG. 1 illustrates an exemplary system for lean inventory management.

FIG. 1 illustrates an exemplary system 100 for lean inventory management. System 100 includes one or more manufacturers 102, one or more suppliers 104, and one or more customers 106. Other embodiments of system 100 may be used without departing from the scope of the present invention.

Manufacturer 102 may be any suitable entity that manufactures at least one product. In this document, the term "product" refers to any manufactured or processed item. A manufacturer 102 may, for example, produce and sell a product to another manufacturer 102, a supplier 104, a customer 106, or other suitable person or enterprise. A supplier 104 may be any suitable entity that offers to sell raw materials or component parts used by manufacturer 102 to produce the product. A customer 106 may be any appropriate entity that purchases or otherwise receives a product from manufacturer 102, such as a retailer of the product. Although FIG. 1 illustrates manufacturers 102, suppliers 104, and customers 106 as separate and distinct entities, the same person or enterprise could simultaneously act as a manufacturer 102, a supplier 104, and/or a customer 106. For example, an enterprise acting as a manufacturer 102 could produce a product, and the same enterprise could act as a supplier 104 to supply the product to another manufacturer 102.

Manufacturers 102, suppliers 104, and customers 106 may be coupled to one another using network 110. Network 110 may include one or more local area networks (LANs), metropolitan area networks (MANs), wide area networks (WANs), a portion of the global computer network known as the Internet, or any other appropriate wireline, wireless, or other system. In this document, the term "couple" refers to any direct or indirect communication between two or more elements in system 100, whether or not those elements are in physical contact with one another.

In the illustrated embodiment, manufacturer 102 has an associated lean inventory management (LIM) server 108. In one embodiment, manufacturer 102 uses a "lean manufacturing" model in which manufacturer 102 attempts to produce substantially the same amount of a product during each window of time in a specified time period. The specified time period may be referred to as a "planning horizon," and each window of time may be referred to as a "bucket." As an example, manufacturer 102 may produce substantially the same amount of a product during each day of the week, where each time bucket has a length of one day and the planning horizon has a length of one week.

In one aspect of the invention, server 108 accesses information identifying predicted customer demand for the product during the planning horizon. Based on this and/or any other appropriate information, server 108 determines a quantity of the product that manufacturer 102 should keep as a lean buffer stock. The lean buffer stock helps to protect manufacturer 102 from customer demand spikes that occur during the planning horizon. For example, if one or more customers 106 need to receive large amounts of the product during the second day of the seven-day planning horizon, the lean buffer stock increases the likelihood that the manufacturer 102 will be able to meet the customer demand for the product at that time. This reduces the likelihood that manufacturer 102 will be late in delivering the product to one or more customers 106.

Server 108 may include one or more processors 114 and a memory 116. Memory 116 may comprise any of a variety of data structures, arrangements, and/or compilations operable to store and facilitate retrieval of information. Memory 116 may, for example, comprise one or more volatile or non-volatile memory devices. Although FIG. 1 illustrates memory 116 as residing within server 108, memory 116 may reside in any location that is accessible by processor 114. Memory 116 receives and stores information related to inventory management operations for manufacturer 102, such as information related to the production of and demand for one or more products. Processor 114 processes information stored in memory 116 and performs inventory management operations for manufacturer 102.

Memory 116 may store and processor 114 may process any suitable information to perform inventory management operations in system 100. The following examples are for illustration only. Any other suitable type of information may be used in system 100 without departing from the scope of the present invention. Also, although the following description describes server 108 receiving information electronically from various sources, other collection methods may be used. For example, a user could enter the data into server 108 using a workstation, personal computer, or any other suitable user device 112.

In one embodiment, memory 116 stores production information 120 that describes the production of one or more products. Production information 120 may, for example and without limitation, identify one or more planning horizons for manufacturer 102 and the size of the time buckets in each planning horizon. As a particular example, production information 120 may identify four planning horizons of one week each, where the time buckets in each planning horizon are one day in length. Production information 120 may also identify the quantity of a product that will be produced during the buckets in each planning horizon. As a particular example, production information 120 may indicate that manufacturer 102 will produce 1,000 units of a product each day in the first and second planning horizons and 1,200 units of the product each day in the third and fourth planning horizons. Production information 120 may include any other suitable information relating to the production of a product.

Memory 116 may also store customer demand information 122, which represents the predicted demand for the product. Customer demand information 122 may, for example and without limitation, identify the quantity of a product that needs to be provided to one or more customers 106 during each time bucket of one or more planning horizons. As a particular example, customer demand information 122 may identify the quantity of a product that is to be provided to customers 106 during each day of four one-week planning horizons. In one embodiment, server 108 may collect information from customers 106 and/or suppliers 104, such as sales information from one or more inventory controllers 132 and/or raw materials information from one or more raw materials controllers 134, respectively. Server 108 may use this and/or other information to predict the amount of a product that needs to be provided to customers 106 during each time bucket of the planning horizons. In another embodiment, server 108 may receive product quantities from customers 106, such as from inventory controllers 132, or from a user of server 108. Customer demand information 122 may also include historical demand information, such as previous amounts of the product delivered to customers. Customer demand information 122 may further include any other suitable information relating to the demand for a product.

In operation, server 108 performs inventory management operations. In one embodiment, manufacturer 102 may maintain a quantity of a product as a lean buffer stock, which protects the manufacturer 102 from customer demand spikes during one or more planning horizons. Processor 114 may use production information 120 and customer demand information 122 to determine a quantity of the product that manufacturer 102 should have in inventory as a lean buffer stock. As a particular example, processor 114 may determine that manufacturer 102 may be unable to meet all of the customer demand for a product in one of the planning horizons because of an early customer demand spike. Processor 114 identifies the quantity of the product that manufacturer 102 should have in inventory as a lean buffer stock to protect against this demand spike. After determining the size of the lean buffer stock, processor 114 may take any appropriate action to make the size of the lean buffer stock available for use in manufacturing the product. Processor 114 may, for example, output the identified lean buffer stock size to a user of server 108. Processor 114 may also automatically adjust production schedules used by manufacturer 102 so that the schedule includes production of the products necessary to create the lean buffer stock.

In one embodiment, server 108 may also identify the size of a safety stock that should be maintained by manufacturer 102. Customer demand information 122 may include information identifying the predicted future demand for a product, but some amount of forecast error is typically present. As a result, the predicted future demand is not known with absolute certainty, and customer demand for the product may be larger than manufacturer 102 predicts. Manufacturer 102 may maintain a quantity of a product as a safety stock, which protects the manufacturer 102 from forecast error in customer demand information 122. In one embodiment, processor 114 may use the average and standard deviation of historical customer demand information 122 for the product to determine the size of the safety stock.

System 100 allows manufacturer 102 to more accurately predict the size of a lean buffer stock. Using this information, manufacturer 102 may protect itself from stock-outs to a greater degree. For example, system 100 may allow manufacturer 102 to determine an appropriate amount of inventory needed to protect against customer demand spikes. Even when multiple customers 106 have changing demand needs and differing demand spikes, system 100 may protect manufacturer 102 from stock-outs to a greater degree than conventional systems. Also, system 100 helps manufacturer 102 to remain responsive to the needs of customers 106. By reducing the likelihood that manufacturer 102 will experience a stock-out, system 100 may help manufacturer 102 to supply products to customers 106 when customers 106 need the products. In addition, system 100 may help manufacturer 102 to reduce waste in the production process. For example, by more accurately predicting the size of a lean buffer stock, manufacturer 102 may reduce the amount of excess product kept in inventory.

Although FIG. 1 illustrates an exemplary embodiment of system 100, various changes may be made without departing from the scope of the present invention. For example, the components of server 108 may operate on one or more computers at one or more locations. Although server 108 is described primarily as being separate from suppliers 104 and customers 106, server 108 may share one or more computer or other appropriate resources with one or more suppliers 104 or customers 106 according to particular needs. Also, although server 108 is primarily described as receiving information 120 and 122 electronically, information 120 and 122 may also be provided directly to server 108 by a user. In addition, the functionality of server 108 may be implemented on any computing device or devices, such as a desktop computer, a laptop computer, or a personal digital assistant. Other changes may be made to system 100 without departing from the scope of the present invention.

Figure 2A:
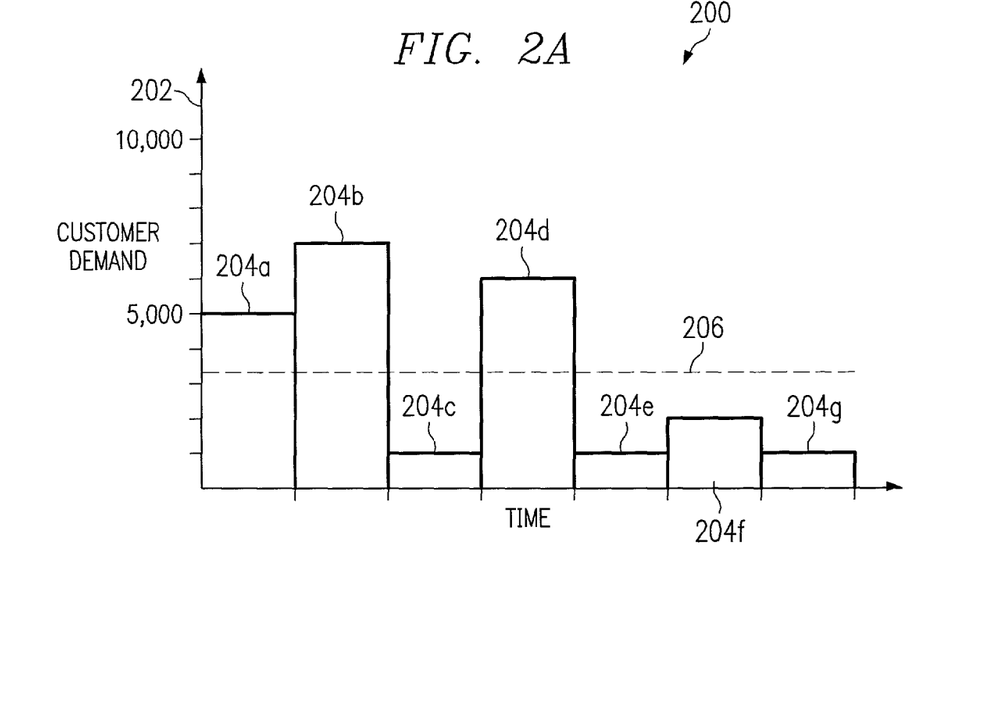
FIGS. 2A and 2B illustrate an exemplary planning horizon and an associated lean inventory management table.
Figure 2B:
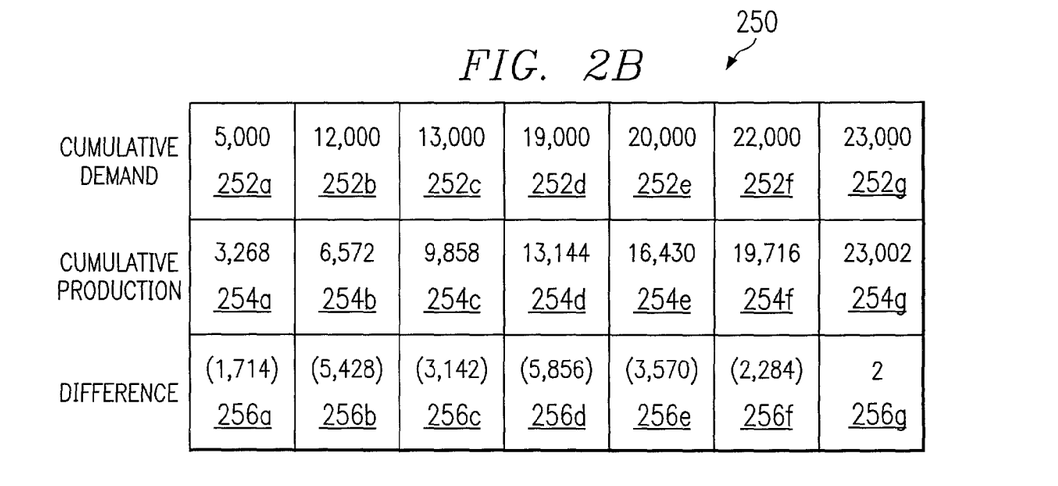

FIGS. 2A and 2B illustrate an exemplary planning horizon 200 and an associated lean inventory management table 250, respectively. FIG. 2A illustrates how customer demand 202 varies in volume during time buckets 204. The lean inventory management table 250 of FIG. 2B may be constructed by server 108 using the planning horizon 200 of FIG. 2A. Lean inventory management table 250 may be used to identify the size of a lean buffer stock, which protects manufacturer 102 from variations in customer demand. The values shown in FIGS. 2A and 2B are for illustration only. Any suitable values may be used without departing from the scope of the present invention. Also, the planning horizon 200 may represent customer demand 202 from a single customer 106, a group of customers 106, or all customers 106.

Referring to FIG. 2A, planning horizon 200 represents some period of time during which a product is to be produced by manufacturer 102. The planning horizon 200 is divided into windows of time, or buckets 204. Time buckets 204 represent periods when manufacturer 102 is producing the product. Buckets 204 may have any suitable length, such as days in a week or work shifts during the week. Customer demand 202 represents the demand of one or more customers 106 for the product produced by manufacturer 102. In the illustrated embodiment, customer demand 202 is broken down by time buckets 204.

In a lean manufacturing environment, manufacturer 102 attempts to produce substantially the same amount of a product during each bucket 204. In FIG. 2A, a production quantity 206 represents the amount of product to be manufactured during each time bucket 204. In one embodiment, server 108 is operable to determine the production quantity 206 to be produced by manufacturer 102 during each bucket 204. Server 108 may use any suitable method for determining the production quantity 206. In one embodiment, server 108 determines the production quantity 206 using the formula:

$$\text{Production Quantity} = \left\lceil \frac{TD + LBS + SS}{N} \right\rceil$$

where TD represents the total customer demand for the product during the planning horizon 200, LBS represents a quantity of product needed for a lean buffer stock in a subsequent planning horizon 200, SS represents a production quantity of product needed (which could be negative) to adjust the safety stock level to that required in a subsequent planning horizon 200, and N represents the number of time buckets 204 in the planning horizon 200.

In a planning horizon 200, customer demand 202 for a product may exceed the production amount 206 during one or more time buckets 204. During one or more of these time buckets 204, manufacturer 102 may be unable to satisfy all of the customer demand 202 for the product. In other words, manufacturer 102 may be unable to produce enough of the product during a time bucket 204 to satisfy customer demand for the product during that time bucket 204. Using the values in FIGS. 2A and 2B as an example, customer demand 202 exceeds the production amount 206 during time buckets 204a, 204b, and 204d. Because of this, manufacturer 102 may be unable to meet customer demand 202 for the product during time buckets 204a–204d.

Server 108 helps manufacturer 102 meet customer demand 202 throughout planning horizon 200 by identifying a quantity of the product that the manufacturer 102 should keep as a lean buffer stock. The manufacturer 102 may use at least a portion of the lean buffer stock to satisfy customer demand 202 for the product during planning horizon 200. In one embodiment, server 108 uses a lean manufacturing table 250 to identify the size of the lean buffer stock.

Referring to FIG. 2B, lean manufacturing table 250 identifies cumulative demand 252 for a product, cumulative production 254 of the product, and a difference 256 between the cumulative demand 252 and the cumulative production 254. Other embodiments of lean manufacturing table 250 may be used without departing from the scope of the present invention. For example, although the information in FIG. 2B is illustrated as being stored in a table 250, any other suitable data structures, arrangements, and/or compilations may be used to store the information.

Cumulative demand 252 represents the cumulative value, or a "running total," of customer demand 202 during time buckets 204 of planning horizon 200. For example, cumulative demand 252b represents the total customer demand 202 during buckets 204a–204b, and cumulative demand 252d represents the total customer demand 202 during buckets 204a–204d. Server 108 may use any suitable method for determining the cumulative demand 252 of the product. In one embodiment, server 108 determines the cumulative demand 252 for a product using the formula:

$$\text{Demand at } TB_i = \sum_{1}^{i} \text{Customer Demand}_i$$

where $TB_i$ represents a time bucket 204, and i represents the number of the time bucket 204 at which the cumulative demand 252 is being computed.

Cumulative production 254 represents the cumulative value or running total of the amount of product produced during time buckets 204 of planning horizon 200. Server 108 may use any suitable method for determining the cumulative production 254 of the product. In one embodiment, server 108 determines the cumulative production 254 for a product using the formula:

$$\text{Production at } TB_i = \text{Production Quantity} * i$$

where $TB_i$ represents a time bucket 204, and i represents the number of the time bucket 204 at which the cumulative production 254 is being computed.

Difference 256 represents a difference between the cumulative demand 252 and the cumulative production 254 during a time bucket 204. The value of difference 256 (if positive) represents the amount of customer demand 202 that manufacturer 102 cannot meet by producing the production quantity 206 of the product. In the illustrated embodiment, differences 256 in parentheses represent values where the cumulative demand 252 exceeds the cumulative production 254, and differences 256 without parentheses represent values where the cumulative production 254 exceeds the cumulative demand 252. Server 108 may use differences 256 to determine the size of a lean buffer stock for manufacturer 102. In one embodiment, server 108 identifies the largest difference 256 between cumulative demand 252 and cumulative production 254, for time buckets 204 where cumulative demand 252 exceeds cumulative production 254. This value represents the largest customer demand that the manufacturer 102 cannot satisfy by producing the production quantity 206 of the product, so the value also represents the size of the lean buffer stock that should be available. In the illustrated embodiment, the largest difference 256 contained in parentheses represents the size of the lean buffer stock to be maintained for planning horizon 200.

To determine the size of a lean buffer stock, server 108 determines the cumulative demand 252 and the cumulative production 254 for the product for each time bucket 204. In the illustrated embodiment, the production quantity 206 is approximately 3,268 units, indicating that manufacturer 102 attempts to produce 3,268 units of the product during each bucket 204. Server 108 determines difference 256 between the cumulative demand 252 and the cumulative production 254 for each time bucket 204. Server 108 identifies the largest difference 256 for a time bucket 204 where the cumulative demand 252 exceeds the cumulative production 254. In this example, difference 256d is the largest difference where cumulative demand 252 exceeds cumulative production 254. The value of difference 256d, 5,856 units of the product, represents the largest amount of customer demand 202 that manufacturer 102 cannot meet by producing the production quantity 206 of the product. In order to satisfy customer demand 202 throughout planning horizon 200, manufacturer 102 should maintain 5,856 units of the product as a lean buffer stock.

In one embodiment, server 108 also determines the production quantity 206 of the product to be produced by manufacturer 102 during each bucket 204. In the illustrated example, there are seven time buckets 204, and the total customer demand 202 for the product is 23,000 units, illustrated in FIG. 2B as the cumulative demand 252g of the last bucket 204. Assuming that no other planning horizons 200 are involved, using the formula described above, the production quantity 206 during planning horizon 200 equals approximately 3,268 (23,000/7) units per bucket.

In addition, server 108 may determine the size of a safety stock that manufacturer 102 should maintain to protect against forecast error in the prediction of customer demand 202. For example, server 108 may determine that the values of each customer demand 202 in planning horizon 200 include a five percent standard deviation. In the illustrated example, a five percent forecast error corresponds to approximately 1,150 units of the product. A safety stock having a size of one standard deviation typically provides a 68 percent chance that the manufacturer 102 will not experience a stock-out due to forecast error. A safety stock having a size of two standard deviations typically provides a 95 percent protection rate against stock-outs due to forecast error, and a safety stock having a size of three standard deviations usually provides a 99 percent protection rate. If manufacturer 102 wants to protect itself to a 95 percent certainty, server 108 may therefore determine that manufacturer 102 needs a safety stock of 2,300 units of the product.

Figure 3:
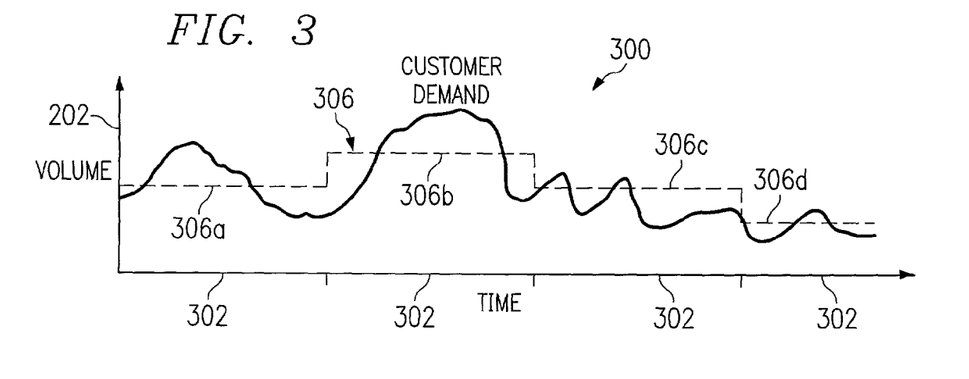
FIG. 3 illustrates an exemplary long-term customer demand pattern.

FIG. 3 illustrates an exemplary long-term customer demand pattern 300. In the illustrated embodiment, customer demand pattern 300 may include multiple shorter-term planning horizons 302. Each planning horizon 302 may be the same or similar to planning horizon 200 of FIG. 2A. In this document, the phrases "long-term" and "short-term" are used to denote relative periods of time, and are not intended to correspond to any particular length of time. The values shown in FIG. 3 are for illustration only. Any suitable values may be used without departing from the scope of the present invention. Also, the demand pattern 300 may represent customer demand 202 from any suitable number of customers 106, such as a single customer 106, a group of customers 106, or all customers 106.

In operation, server 108 may determine the size of a lean buffer stock that manufacturer 102 should keep during one or more planning horizons 302. Server 108 may also determine the production quantity 306 that manufacturer 102 should produce during planning horizons 302. In addition, server 108 may determine the size of a safety stock that manufacturer 102 should keep during one or more planning horizons 302.

In one embodiment, server 108 determines the size of a lean buffer stock for planning horizons 302 starting with the horizon 302d that is farthest away in time. Server 108 determines the size of a lean buffer stock for that horizon 302d, and the quantity of product in the lean buffer stock then becomes an amount of the product to be produced during the previous horizon 302c in addition to the amount that would otherwise be produced during the previous horizon 302c. For example, server 108 may treat the lean buffer stock size for horizon 302d as an amount of product to be delivered during the last time bucket of horizon 302c. Server 108 then determines the size of a lean buffer stock for planning horizon 302c, and the quantity of product in this lean buffer stock becomes an additional amount of product to be produced during the previous horizon 302b. Server 108 repeats the same process for horizons 302b and then 302a to determine the sizes of lean buffer stocks for horizons 302b and 302a, respectively.

Server 108 may also determine the size of a safety stock that manufacturer 102 should keep during one or more planning horizons 302. Server 108 may determine the sizes of the safety stocks using any suitable method. In one embodiment, server 108 uses the standard deviation of the customer demand 202 in a horizon 302 to determine the size of the safety stock for that horizon 302.

In addition, server 108 may determine the production quantity 306 that manufacturer 102 should produce during planning horizons 302. For example, server 108 may sum the total customer demand 202 during horizon 302d and divide that by the number of time buckets in horizon 302d. For each of horizons 302a–302c, server 108 may sum the total customer demand 202 during a current horizon 302i, the size of the lean buffer stock for the following horizon 302(i+1), and the size of the safety stock for the following horizon 302(i+1), and divide that by the number of time buckets in the current horizon 302i. For example, for horizon 302b, server 108 may sum the total customer demand 202 during horizon 302b and the sizes of the lean buffer stock and the safety stock needed for horizon 302c, and divide that by the number of time buckets in horizon 302b.

Figure 4:
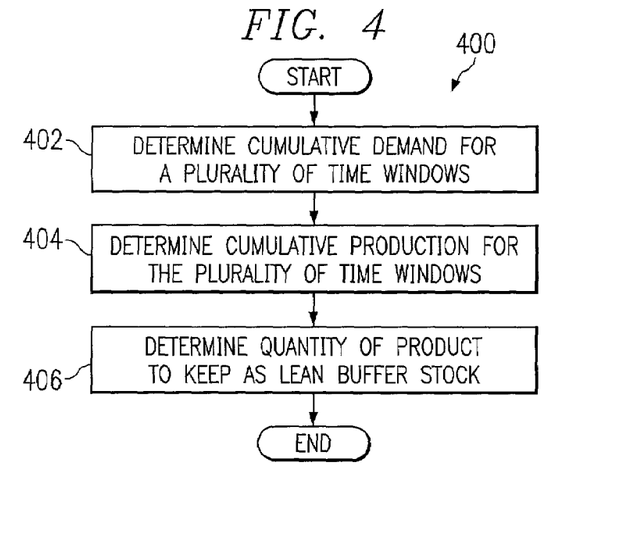
FIG. 4 illustrates an exemplary method for identifying a size of a lean buffer stock.

FIG. 4 illustrates an exemplary method 400 for identifying a size of a lean buffer stock. Server 108 determines the cumulative demand for a plurality of time windows at step 402. This may include, for example, server 108 receiving or determining customer demand 202 for a plurality of time buckets 204. This may also include server 108 determining the cumulative customer demands 252 and storing the cumulative demands 252 in a lean inventory management table 250. Server 108 determines the cumulative production during the plurality of time windows at step 404. This may include, for example, server 108 receiving or determining the production quantity 206 of the product for a planning horizon 200. This may also include server 108 determining the cumulative productions 254 and storing the cumulative productions 254 in the lean inventory management table 250.

Server 108 determines a quantity of product that manufacturer 102 should keep in a lean buffer stock at step 406. This may include, for example, server 108 determining a difference 256 between the cumulative demand 252 and the cumulative production 254 for each time bucket 204. This may also include server 108 identifying the largest difference 256 that occurs when the cumulative demand 252 exceeds the cumulative production 254. The quantity of product determined at step 406 represents the size of the lean buffer stock that helps to protect manufacturer 102 from variations in customer demand during a planning horizon 200.

Although FIG. 4 illustrates one embodiment of a method for identifying a size of a lean buffer stock, various changes may be made to method 400 without departing from the scope of the present invention. For example, server 108 may determine the cumulative production 254 of the product before determining cumulative demand 252 for the product. Also, server 108 may determine the cumulative demand 252, cumulative production 254, and difference 256 for one time bucket 204 before proceeding to the next time bucket 204.

Figure 5:
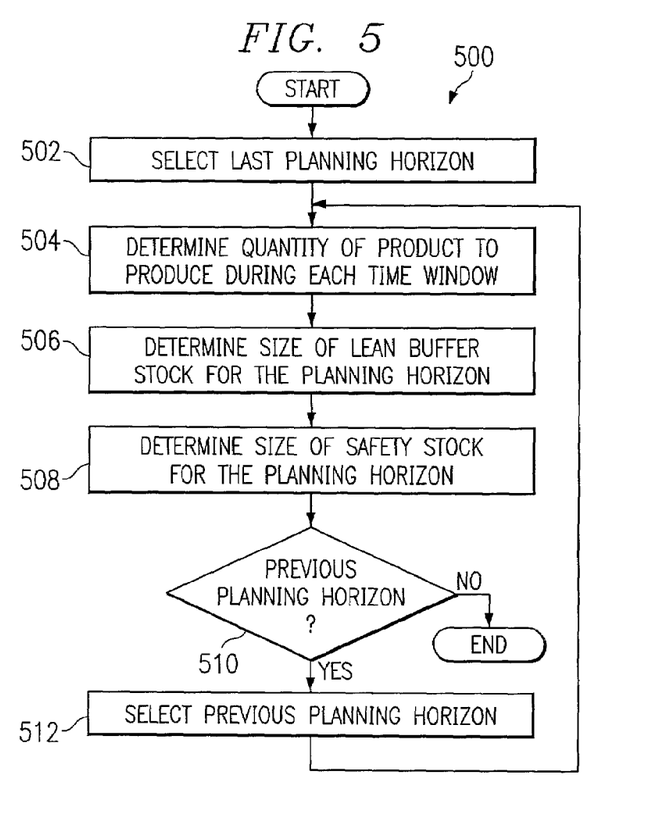
FIG. 5 illustrates an exemplary method for lean inventory management.

FIG. 5 illustrates an exemplary method 500 for lean inventory management. Server 108 selects a last planning horizon at step 502. This may include, for example, server 108 selecting a planning horizon 302 that is farthest away in time. Server 108 determines a quantity of the product to be produced during each time window of the selected planning horizon at step 504. This may include, for example, server 108 determining a total customer demand 202 for the product during the planning horizon 302 and dividing the total by the number of time buckets in the planning horizon 302.

Server 108 determines the size of a lean buffer stock for the selected planning horizon at step 506. This may include, for example, server 108 using the method 400 illustrated in FIG. 4 or any other suitable method to identify the size of a lean buffer stock. Server 108 determines the size of a safety stock for the selected planning horizon at step 508. This may include, for example, server 108 identifying the standard deviation of the values used to calculate the customer demand 202. This may also include server 108 identifying the desired level of protection for manufacturer 102.

Server 108 determines whether additional planning horizons are available at step 510. This may include, for example, server 108 determining if a planning horizon 302 precedes the current horizon 302. If a previous planning horizon 302 exists, server 108 selects the previous planning horizon 302 at step 512. Server 108 returns to step 504 to process the next selected planning horizon 302. During steps 504–508, server 108 may take into account the sizes of the lean buffer stock and/or the safety stock determined during the previous pass through method 500. For example, if server 108 is processing planning horizon 302c, server 108 may consider the sizes of the lean buffer stock and/or the safety stock for planning horizon 302d. In this way, server 108 may help to ensure that, if a lean buffer stock is needed for planning horizon 302d, manufacturer 102 may manufacture the product and place it in the lean buffer stock during planning horizon 302c. Once server 108 has processed the planning horizons 302, method 500 ends.

Although FIG. 5 illustrates one embodiment of a method for inventory management, various changes may be made to method 500 without departing from the scope of the present invention. For example, server 108 may determine the size of the safety stock before determining the size of the lean buffer stock. Also, server 108 may determine the size of the lean buffer stock and not determine the size of the safety stock.

Although the present invention has been described with several embodiments, a number of changes, substitutions, variations, alterations, and modifications may be suggested to one skilled in the art, and it is intended that the invention encompass all such changes, substitutions, variations, alterations, and modifications that fall within the spirit and scope of the appended claims.

What is claimed is:

1. A computer-implemented method for inventory management, the method performed using a computer system comprising one or more processing units and one or more memory units, the method comprising:

using the computer system, determining a first cumulative demand value for each of a plurality of time windows within a first planning horizon, the first cumulative demand value for a time window representing a cumulative demand for at least one product over the time window and all previous time windows in the first planning horizon;

using the computer system, determining a first forecasted production quantity value for the first planning horizon using a first total forecasted demand value that represents total demand for the product during the first planning horizon, the first forecasted production quantity value representing an estimated quantity of the product to be manufactured during each time window of the first planning horizon;

using the computer system, determining a cumulative production value for each time window of the first planning horizon using the first forecasted production quantity value;

using the computer system, determining a first lean buffer stock value using the first cumulative demand values and the cumulative production values for the first planning horizon, the first lean buffer stock value representing a quantity of the product to use as a lean buffer stock for the first planning horizon;

using the computer system, determining a second cumulative demand value for each of a plurality of time windows within a second planning horizon preceding the first planning horizon;

using the computer system, determining a second forecasted production quantity value for the second planning horizon using the first lean buffer stock value and a second total forecasted demand value that represents total demand for the product during the second planning horizon;

using the computer system, determining a cumulative production value for each time window of the second planning horizon using the second forecasted production quantity value;

using the computer system, determining a second lean buffer stock value using the second cumulative demand values and the cumulative production values for the second planning horizon, the second lean buffer stock value representing a quantity of the product to use as a lean buffer stock for the second planning horizon; and using the computer system, making the first and second lean buffer stock values available for use in manufacturing the product.

2. Software for inventory management, the software embodied in at least one computer-readable medium and, when executed on a computer system comprising one or more processing units and one or more memory units, operable to:

using the computer system, determine a first cumulative demand value for each of a plurality of time windows within a first planning horizon, the first cumulative demand value for a time window representing a cumulative demand for at least one product over the time window and all previous time windows in the first planning horizon;

using the computer system, determine a first forecasted production quantity value for the first planning horizon using a first total forecasted demand value that represents total demand for the product during the first planning horizon, the first forecasted production quantity value representing an estimated quantity of the product to be manufactured during each time window of the first planning horizon;

using the computer system, determine a cumulative production value for each time window of the first planning horizon using the first forecasted production quantity value;

using the computer system, determine a first lean buffer stock value using the first cumulative demand values and the cumulative production values for the first planning horizon, the first lean buffer stock value representing a quantity of the product to use as a lean buffer stock for the first planning horizon;

using the computer system, determine a second cumulative demand value for each of a plurality of time windows within a second planning horizon preceding the first planning horizon;

using the computer system, determine a second forecasted production quantity value for the second planning horizon using the first lean buffer stock value and a second total forecasted demand value that represents total demand for the product during the second planning horizon;

using the computer system, determine a cumulative production value for each time window of the second planning horizon using the second forecasted production quantity value;

using the computer system, determine a second lean buffer stock value using the second cumulative demand values and the cumulative production values for the second planning horizon, the second lean buffer stock value representing a quantity of the product to use as a lean buffer stock for the second planning horizon; and using the computer system, make the first and second lean buffer stock values available for use in manufacturing the product.

3. A computer-implemented system for inventory management, comprising:

computer memory containing:
    a first cumulative demand value for each of a plurality of time windows within a first planning horizon, the first cumulative demand value for a time window representing a cumulative demand for at least one product over the time window and all previous time windows in the first planning horizon; and
    a second cumulative demand value for each of a plurality of time windows within a second planning horizon preceding the first planning horizon; and one or more computer processors collectively operable to:
    determine a first forecasted production quantity value for the first planning horizon using a first total forecasted demand value that represents total demand for the product during the first planning horizon, the first forecasted production quantity value representing an estimated quantity of the product to be manufactured during each time window of the first planning horizon;
    determine a cumulative production value for each time window of the first planning horizon using the first forecasted production quantity value;
    determine a first lean buffer stock value using the first cumulative demand values and the cumulative production values for the first planning horizon, the first lean buffer stock value representing a quantity of the product to use as a lean buffer stock for the first planning horizon;
    determine a second forecasted production quantity value for the second planning horizon using the first lean buffer stock value and a second total forecasted demand value that represents total demand for the product during the second planning horizon;
    determine a cumulative production value for each time window of the second planning horizon using the second forecasted production quantity value;
    determine a second lean buffer stock value using the second cumulative demand values and the cumulative production values for the second planning horizon, the second lean buffer stock value representing a quantity of the product to use as a lean buffer stock for the second planning horizon; and
    make the first and second lean buffer stock values available for use in manufacturing the product.

4. The method of claim 1, wherein determining the first lean buffer stock value comprises:
    determining a difference between the first cumulative demand value and the cumulative production value for each time window; and
    selecting the largest positive difference among all the time windows as the first lean buffer stock value.

5. The method of claim 1, wherein determining the second lean buffer stock value comprises:
    determining a difference between the second cumulative demand value and the cumulative production value for each time window; and
    selecting the largest positive difference among all the time windows as the second lean buffer stock value.

6. The method of claim 1, wherein the cumulative production value is determined by summing the first forecasted production quantity values over the particular time window and all previous time windows in the first planning horizon.

7. The method of claim 6, wherein the first forecasted production quantity value is determined by dividing the first total forecasted demand value representing a first total forecasted demand for the product over all time windows by the number of time windows.

8. The method of claim 1, wherein cumulative production value is determined by summing the second forecasted production quantity values over the particular time window and all previous time windows in the second planning horizon.

9. The method of claim 8, wherein the second forecasted production quantity value is determined by dividing the second total forecasted demand value representing a second total forecasted demand for the product over all time windows by the number of time windows.

10. The software of claim 2, wherein the software is operable to determine the first lean buffer stock value by:
    determining a difference between the first cumulative demand value and the cumulative production value for each time window; and
    selecting the largest positive difference among all the time windows as the first lean buffer stock value.

11. The software of claim 2, wherein the software is operable to determine the second lean buffer stock value by:
    determining a difference between the second cumulative demand value and the cumulative production value for each time window; and
    selecting the largest positive difference among all the time windows as the second lean buffer stock value.

12. The software of claim 2, wherein the software is operable to determine the cumulative production value by summing the first forecasted production quantity values over the particular time window and all previous time windows in the first planning horizon.

13. The software of claim 12, wherein the software is further operable to determine the first forecasted production quantity value by dividing the first total forecasted demand value representing a first total forecasted demand for the product over all time windows by the number of time windows.

14. The software of claim 2, wherein the software is operable to determine the cumulative production value by summing the second forecasted production quantity values over the particular time window and all previous time windows in the second planning horizon.

15. The software of claim 14, wherein the software is further operable to determine the second forecasted production quantity value by dividing the second total forecasted demand value representing a second total forecasted demand for the product over all time windows by the number of time windows.

16. The system of claim 3, wherein the processor is operable to determine the first lean buffer stock value by:
   determining a difference between the first cumulative demand value and the cumulative production value for each time window; and
   selecting the largest positive difference among all the time windows as the first lean buffer stock value.

17. The system of claim 3, wherein the processor is operable to determine the second lean buffer stock value by:
   determining a difference between the second cumulative demand value and the cumulative production value for each time window; and
   selecting the largest positive difference among all the time windows as the second lean buffer stock value.

18. The system of claim 3, wherein the processor is operable to determine the cumulative production value by summing the first forecasted production quantity values over the particular time window and all previous time windows in the first planning horizon.

19. The system of claim 18, wherein the processor is further operable to determine the first forecasted production quantity value by dividing the first total forecasted demand value representing a first total forecasted demand for the product over all time windows by the number of time windows.

20. The system of claim 3, wherein the processor is operable to determine the cumulative production value by summing the second forecasted production quantity values over the particular time window and all previous time windows in the second planning horizon.

21. The system of claim 20, wherein the processor is further operable to determine the second forecasted production quantity value by dividing the second total forecasted demand value representing a second total forecasted demand for the product over all time windows by the number of time windows.

* * * * *